Oct. 20, 1936.   C. SAUZEDDE   2,057,694
FLUID PRESSURE BRAKE ACTUATING UNIT
Filed July 18, 1932   2 Sheets-Sheet 2

INVENTOR
Claude Sauzedde
BY
ATTORNEYS

UNITED STATES PATENT OFFICE 2,057,694

FLUID PRESSURE BRAKE ACTUATING UNIT

Claude Sauzedde, Detroit, Mich., assignor to Detroit Hydrostatic Brake Corporation, Detroit, Mich., a corporation of Michigan Application July 18, 1932, Serial No. 623,120

7 Claims. (Cl. 188—152)

The present invention relates to a hydrostatic brake mechanism of a type particularly adapted for use on automotive and aircraft wheels, and especially refers to the construction and arrangement of the fluid pressure units that cause the braking action by moving the brake shoes into contact with conical drums.

The primary object of the present invention is to devise a brake shoe actuating unit which is operated by fluid pressure for use in wheels embodying a plurality of sectional-type conical double-faced brake shoes to simultaneously move said brake shoes radially into contact with conically shaped brake drums and to move said brake shoes out of engagement with said brake drums when pressure is removed from the fluid. The unit comprises a spider that is designed to be mounted upon an axle spindle that supports a wheel and means on the spider for receiving the brake shoes in a manner whereby all actuating parts, particularly the springs for retracting the brake shoes, are enclosed within the spider.

Figure 1:
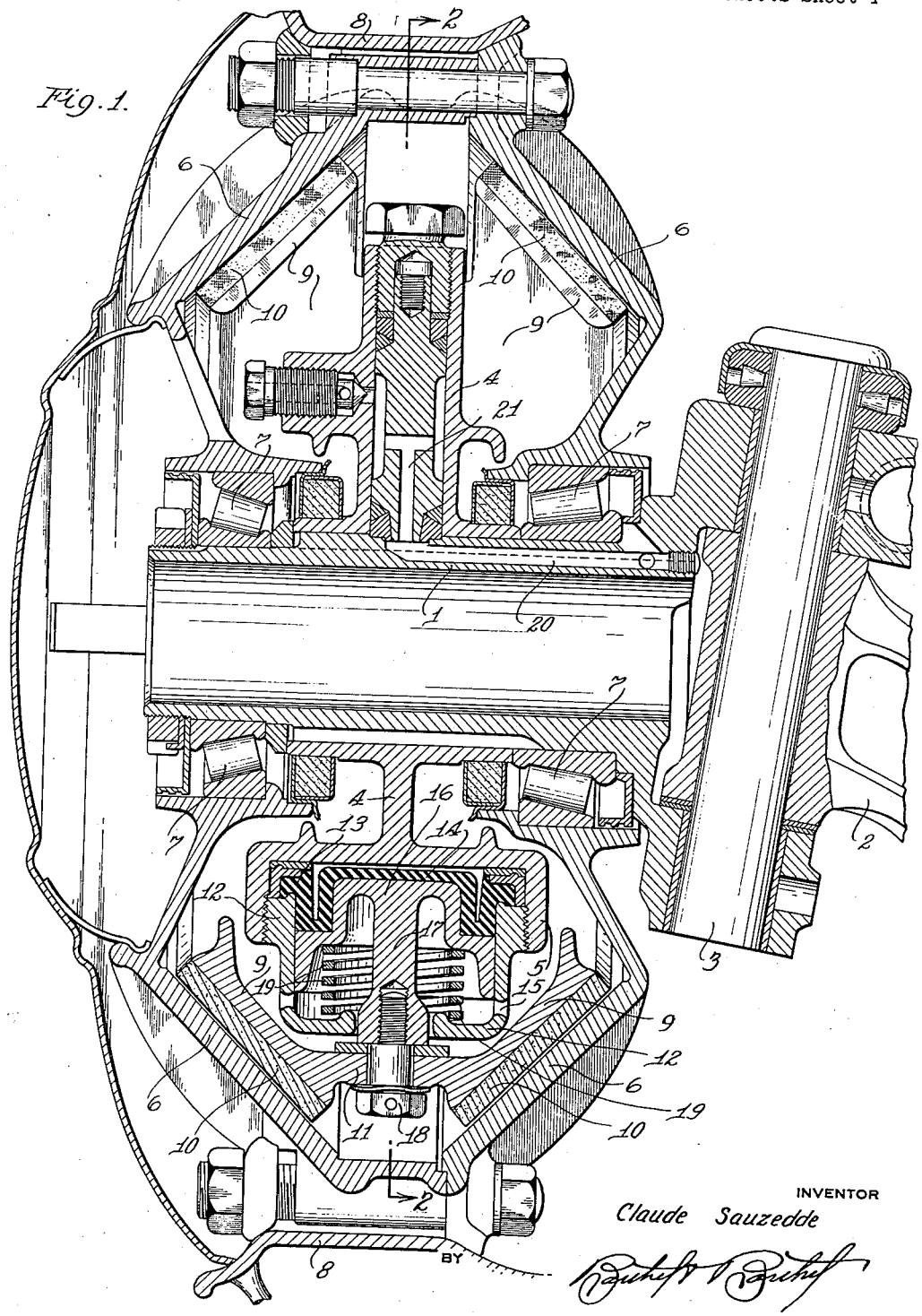
Figure 2:
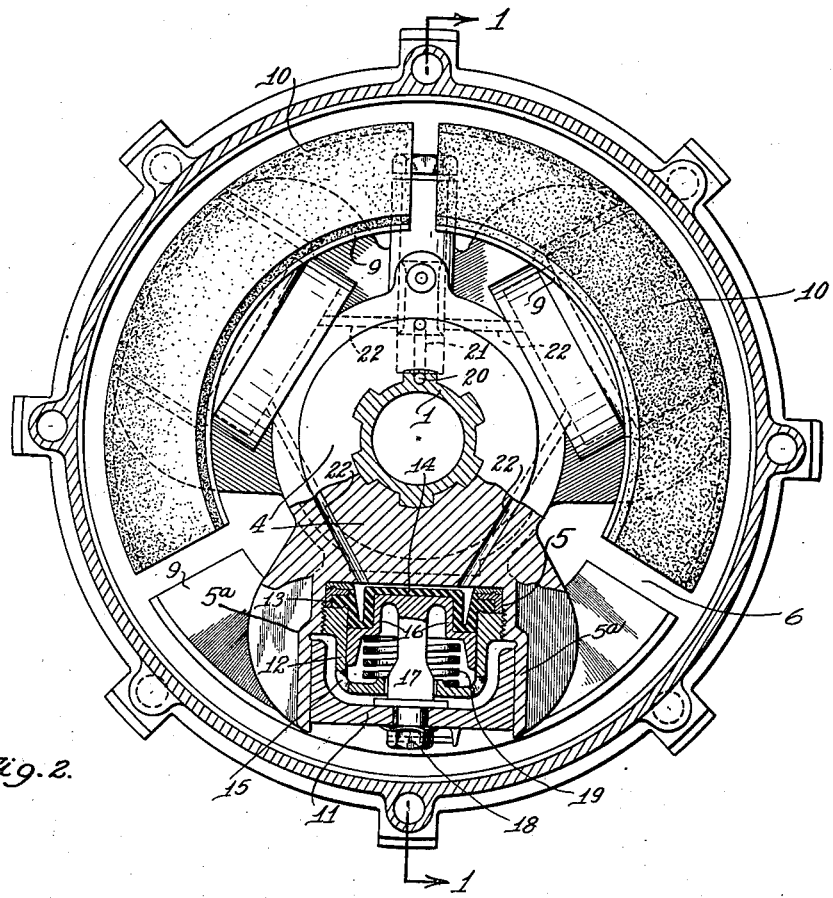
Figure 3:
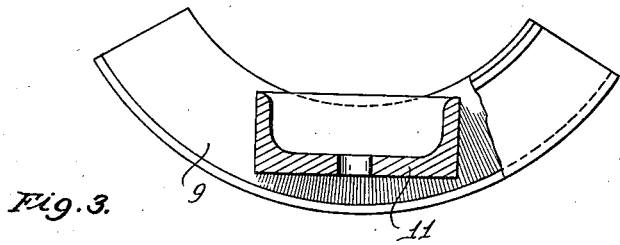

With the above and other ends in view the invention consists in matters hereinafter set forth and more particularly pointed out in the appended claims, reference being had to the accompanying drawings, in which Figure 1 is a cross section taken substantially along line 1—1 of Fig. 2;

Fig. 2 is a cross section, with parts in elevation, taken substantially along the line 2—2 of Fig. 1, and Fig. 3 is a cross sectional detail of one of the brake shoes.

Like characters of reference are employed throughout to designate corresponding parts.

The numeral 1 indicates a dirigible type wheel supporting stub axle spindle that is pivotally mounted on an axle 2 by a spindle 3. Non-rotatably splined on the stub axle spindle 2 is a spider 4 having a plurality of integrally formed internally threaded expansion chambers 5. A pair of brake drum members 6 are rotatably supported on the stub axle spindle by bearings 7 to support a tire rim 8 and form a drum suitable for receiving conical brakes.

Conical sectional type segmental brake shoes 9 are formed with parallel angularly-disposed oppositely positioned surfaces to which brake shoe lining 10 is secured, the shoes being joined together in pairs by cross web members 11. Cylindrical members 12 are screwthreaded into the expansion chambers 5 and engage flanges 13 on the double-cup flexible seals 14 in a manner to tightly clamp the flanges between the lower ends of the cylindrical members 12 and the bottoms of the expansion chambers 5. The cylindrical members 12 are provided with vent openings 15.

Received in the space enclosed by each expansion chamber 5 and its cylindrical member 12 is a reciprocal piston 16 having a stepped head that is received in the double-cup seal 14. Each piston has an axially extending integral rod 17 that extends through an opening in the cylindrical member 12 and which is secured to the cross web 11 on one pair of brake shoes by a bolt 18. A compressed coiled spring 19 is sleeved on the rod 17 and engages the piston 16 and the cylindrical member 12 in a manner tending to force said piston towards the stub axle spindle 1. Opposite sides of the cross web 11 are guided by parallel guides 5a formed as continuations of the wall of the chamber 5.

In the stub axle spindle 1 is formed a passage 20 that is adapted to be connected to a source for supplying fluid under pressure. Passages 21 and 22 in the spider communicate with the passage 20 and provide communication therefrom to the plurality of expansion chambers 5.

In operation fluid under pressure passing through passages 20, 21 and 22 enters the expansion chambers 5 and forces the seals 14 outwardly. Outward movement of the seals causes similar movement of the pistons 16 which are secured to the brake shoes through bolts 18 and webs 11 and the shoes are thereby moved outwardly and into contact with the brake drums 6. When the fluid pressure is released the springs 19 exert pressure between the cylindrical member 12 and the piston which moves the pistons inwardly and thereby moves the brake shoes out of engagement with the brake drums.

In the present construction and mode of operation the brake shoes may be removed and replaced without affecting any adjustments of the brake actuating unit wherein all parts are completely enclosed and particularly the brake retracting springs.

Although a specific embodiment of the present invention has been illustrated and described it is to be understood that various changes may be made within the scope of the appended claims without departing from the spirit of the invention, and such changes are contemplated.

What I claim is:

1. In hydrostatic braking systems for vehicular service, wherein a plurality of brake-shoe units are concurrently applied to complemental braking surfaces carried by a wheel of the vehicle with the shoe application provided by hydrostatic pressure rendered active upon pistons individual to the units and forming a support for the brake-shoes of the unit, wherein the wheel forms a housing for the brake-shoe units and operating structures, and wherein the pistons are positioned in similar relation to a plane normal to the wheel axis extending intermediate the brake-shoes of a unit and axially of the respective pistons with the latter extending radially of the wheel, such assembly including an axle, a spider fixedly supported in relation thereto and provided with expansion chambers substantially symmetrical with respect to such plane and each in open communication with the source of hydrostatic pressure supply through the spider, the number of chambers and brake-shoe units being equal to provide a chamber individual to each unit, parallel guides on the spider in substantial parallelism with the chamber axis and similarly disposed relative to such plane, each brake-shoe unit being connected to the piston of the expansion chamber by a piston stem extending outwardly co-axial with the chamber axis, such brake-shoe units each having a pair of braking faces symmetrical to and spaced from such plane, the unit being removably secured to the outer end of the piston stem intermediate said faces, the faces extending arcuately in directions parallel to such plane and outside of said guides, and an expansion spring within the expansion chamber about the piston stem and co-operating with the piston and a chamber wall to be operative on the piston in opposition to the hydrostatic pressure, whereby the brake-shoe units will be moved radially outward with the piston by hydrostatic pressure when applying the brakes and radially inward with the piston by the unit spring.

2. A system as in claim 1 characterized in that the expansion chambers are substantially uniformly spaced angularly on such plane with the guides symmetrically disposed relative to such plane.

3. A system as in claim 1 characterized in that an expansion chamber includes a two-part formation with the parts in threaded relation, one of said parts having the cylinder wall with which the piston co-operates, and one of said parts presenting an abutment for one end of the spring and having an opening through which the connections between the brake-shoe unit and piston extend.

4. A system as in claim 1 characterized in that an expansion chamber includes a two-part formation with the parts in threaded relation, one of the parts having the cylinder wall with which the piston co-operates, and one of said parts presenting an abutment for one end of the spring and having means for open communication between the interior of the part beyond the piston and the exterior of such part.

5. A system as in claim 1 characterized in that an expansion chamber includes an outwardly-cupped member carried by the spider and an inwardly-cupped member threaded thereto with the latter carrying the cylinder walls co-operating with the piston and also having an opening through which the piston and unit are connected, the spring being located between the bottom of the latter member and a piston abutment.

6. A system as in claim 1 characterized in that an expansion chamber includes an outwardly-cupped member carried by the spider and an inwardly-cupped member threaded thereto with the latter carrying the cylinder wall co-operating with the piston and also having an opening through which the piston and unit are connected, said members being operative to anchor a seal formation relative to the bottom of the outwardly-cupped member and the inner face of the piston.

7. A system as in claim 1 characterized in that an expansion chamber includes an outwardly-cupped member carried by the spider and an inwardly-cupped member threaded thereto with the latter carrying the cylinder wall co-operating with the piston and also having an opening through which the piston and unit are connected, the piston having a stepped inner zone, and a double-cupped seal anchored by said members relative to the bottom of the outwardly-cupped member and having the seal cup portions extending into the stepped zone of the piston.

CLAUDE SAUZEDDE.